United States Patent [19]

Nakamura

[11] 4,398,514
[45] Aug. 16, 1983

[54] SYSTEM FOR CONTROLLING NO LOAD OPERATION OF INTERNAL COMBUSTION ENGINE

[75] Inventor: Koyo Nakamura, Yokosuka, Japan

[73] Assignee: Nissan Motor Company, Limited, Yokohama, Japan

[21] Appl. No.: 231,343

[22] Filed: Feb. 4, 1981

[30] Foreign Application Priority Data

Feb. 6, 1980 [JP] Japan .............................. 55-12797[U]

[51] Int. Cl.³ ............................................ F02D 33/00
[52] U.S. Cl. .................................. 123/339; 123/328; 123/440
[58] Field of Search ............... 123/339, 327, 328, 440, 123/489, 491, 493, 438, 589, 480

[56] References Cited

U.S. PATENT DOCUMENTS

| Re. 29,741 | 8/1978 | Norimatsu et al. | 123/440 |
|---|---|---|---|
| 3,964,457 | 6/1976 | Coscia | 123/339 |
| 4,088,095 | 5/1978 | Aono | 123/440 |
| 4,109,615 | 8/1978 | Asano | 123/440 |
| 4,237,838 | 12/1980 | Kinagawa et al. | 123/339 |
| 4,290,107 | 9/1981 | Suda et al. | 123/489 |
| 4,291,656 | 9/1981 | Miyagi et al. | 123/339 |

Primary Examiner—Charles J. Myhre
Assistant Examiner—Andrew M. Dolinar
Attorney, Agent, or Firm—Schwartz, Jeffery, Schwaab, Mack, Blumenthal & Koch

[57] ABSTRACT

A system for controlling no load operation of an internal combustion engine is provided wherein an actual engine speed signal and a target engine speed signal are compared and the air flow past a throttle valve is controlled to reduce the difference between these two signals. Subsequently, an actual air fuel ratio and a target air fuel ratio are compared and the air fuel ratio of the mixture to the engine is controlled to reduce the difference between the actual and target air fuel ratio signals. During deceleration of the engine, air flow is controlled to maintain the manifold vacuum smaller than a predetermined value so as to prevent unnecessary enrichment of the mixture due to the vacuum and then air fuel ratio is controlled to reduce the difference between the actual air fuel ratio signal and a target deceleration air fuel ratio signal.

5 Claims, 3 Drawing Figures

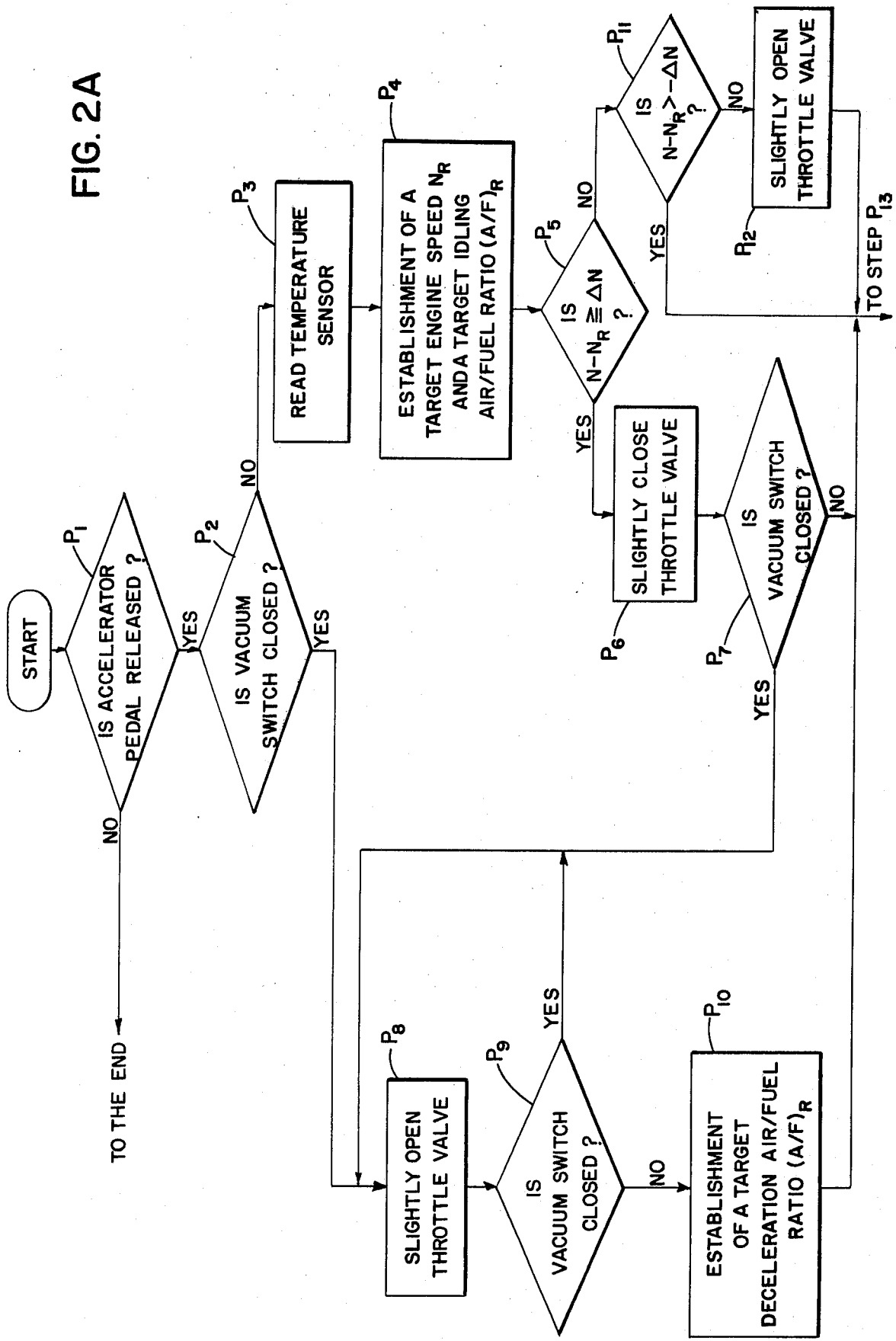

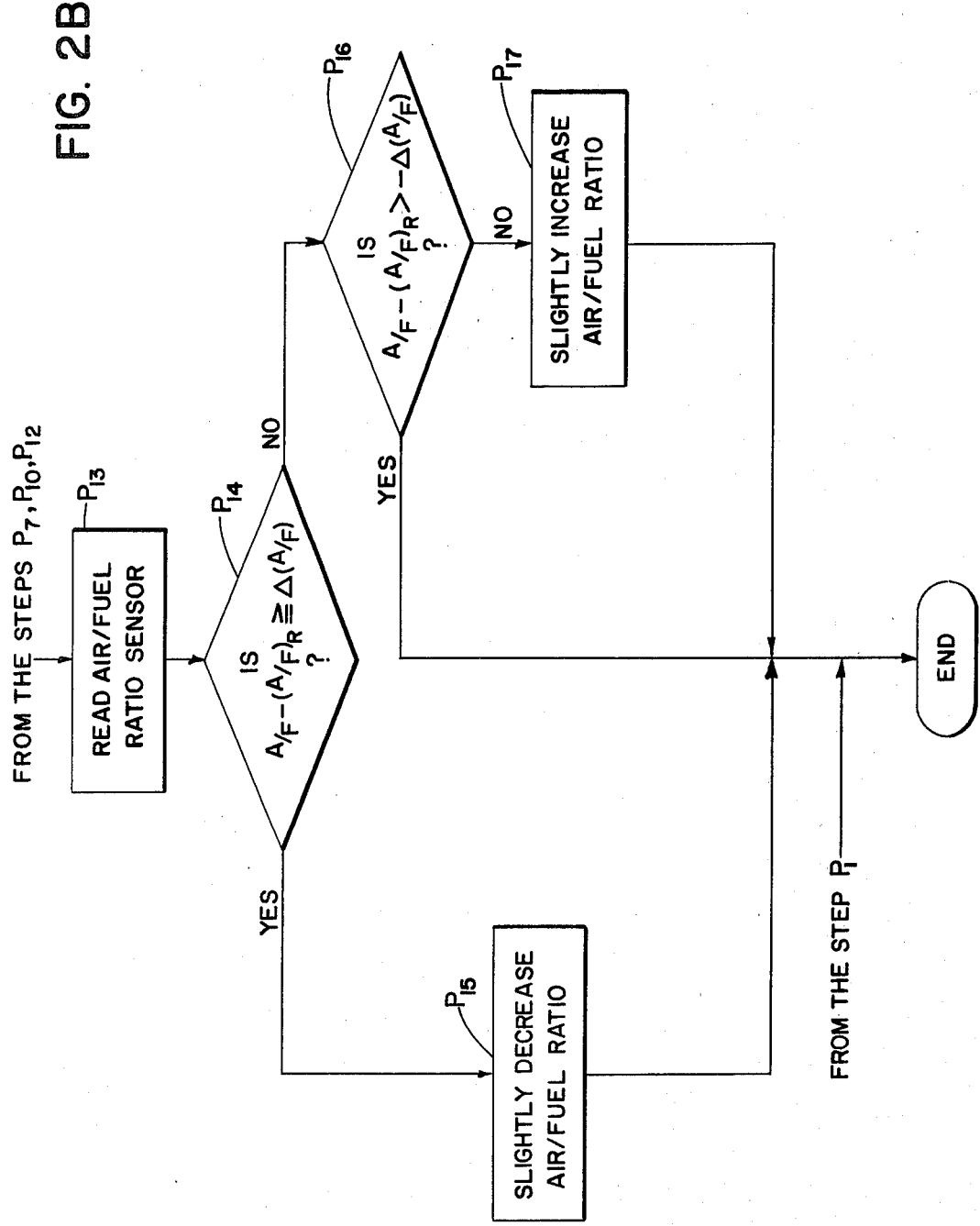

SYSTEM FOR CONTROLLING NO LOAD OPERATION OF INTERNAL COMBUSTION ENGINE

BACKGROUND OF THE INVENTION

1. Field of the Invention

The invention relates to a system for controlling no load operation of an internal combustion engine during idle or deceleration.

2. Description of the Prior Art

In controlling idle speed and air fuel ratio during no load operation of a carburetor injected internal combustion engine, a slow adjusting screw and/or an air adjusting screw must be carefully adjusted.

However, it is difficult to maintain the air/fuel ratio constant during no load operation, since the engine speed varies in accordance with the engine temperature during no load operation, specifically, during idle operation, and it varies among engines depending on degree of aging of the engine.

Some carburetors are provided with a fast idle mechanism or a choke mechanism. The amount of intake air and the air/fuel ratio are controlled by such mechanisms in order to stabilize the engine and to shorten the period for engine warming-up. However, these carburetor systems also have a problem in that it is impossible to control the engine speed and the air/fuel ratio to desired values.

In the case of fuel injected engines, the flow rate of the air flowing through a bypass passage bypassing a throttle valve is controlled by a bypass air adjusting screw or a temperature sensitive bypass air control valve. The quantity of fuel injected is determined on the basis of the output signal of an air flow meter which detects the quantity of the air flowing through the bypass passage. However, these engines also have a problem in that the deviations between the engine speed and the air/fuel ratio with respect to desired values grow larger when the air flow meter produces an erroneous output signal. Thus, the prior art fuel supply systems suffer from a drawback that the engine speed and the air/fuel ratio are not controlled accurately during no load engine operation.

SUMMARY OF THE INVENTION

A system according to the present invention which controls no load operation of an internal combustion engine, comprises target idle speed generating means for receiving an engine temperature signal and generating a target idle speed signal having a temperature dependent value indicative of idle speed required to sustain the operation of the engine at the sensed engine temperature, means for comparing the actual engine speed signal with the target idle speed and generating an idle air flow control signal indicative of the change in the air flow to the engine necessary to reduce the difference between the actual engine speed and the target idle speed, and means for controlling the idle air flow to the engine in response to the idle air flow control signal to change the actual engine speed and reduce the difference between the actual engine speed and the target idle speed. The system preferably comprises target idle air fuel ratio generating means for receiving the temperature signal and for generating a target idle air fuel ratio signal having a temperature dependent value; means for comparing the actual air fuel ratio signal with the target idle air fuel ratio signal and for generating an idle air fuel ratio control signal indicative of the change in the air fuel ratio of the air fuel mixture to the engine necessary to reduce the difference between the actual air fuel ratio and the target idle air fuel ratio; and means for controlling the air fuel ratio of the air fuel mixture to the engine in response to the idle air fuel ratio control signal to change the air fuel ratio of the idle air fuel mixture to the engine and reduce the difference between the actual air fuel ratio and the target idle air fuel ratio.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 2a and FIG. 2b, when combined, are a flow diagram showing the operation of the control means C shown in FIG. 1.

DETAILED DESCRIPTION OF A PREFERRED EMBODIMENT

Figure 1:
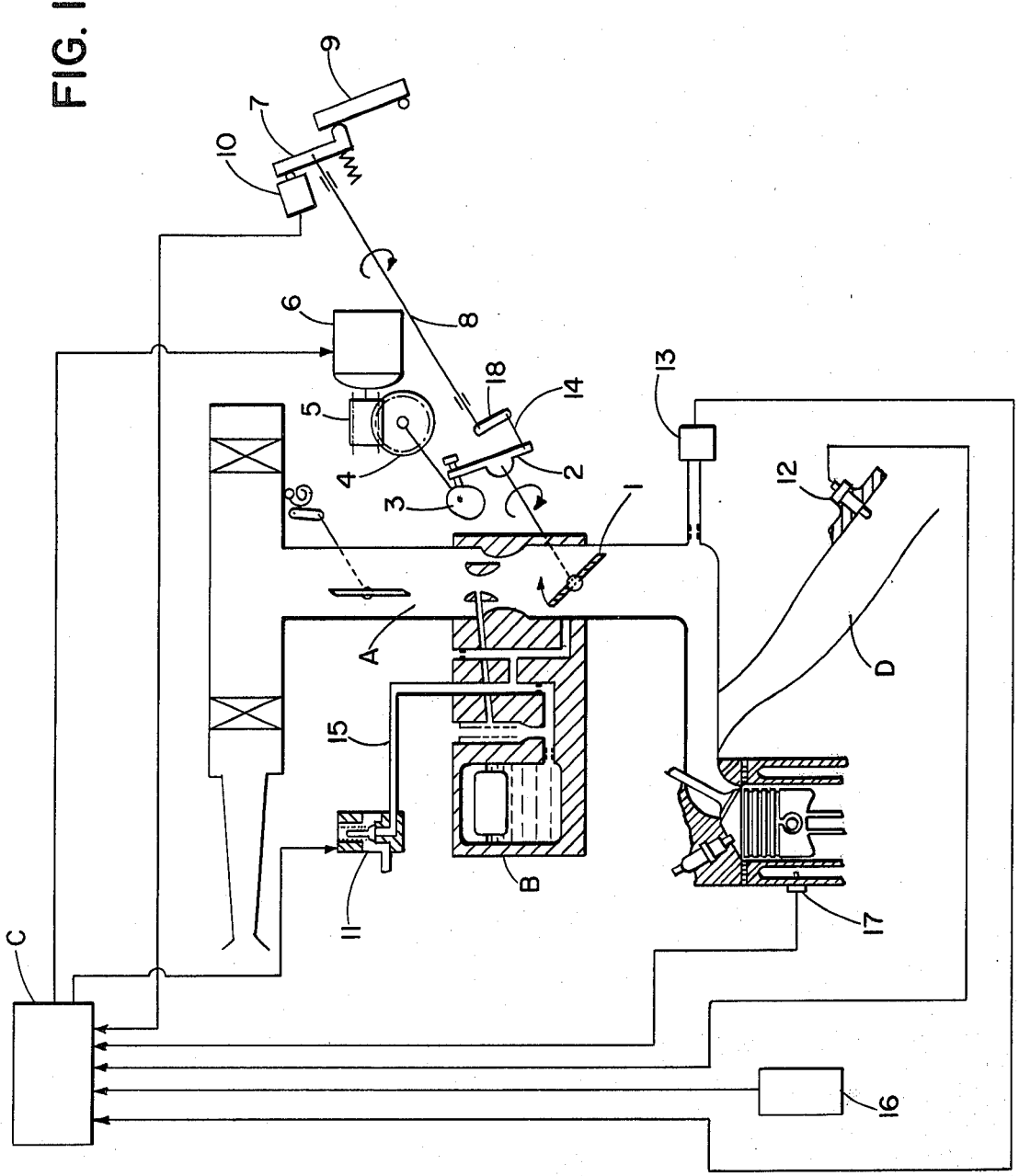
FIG. 1 is a schematic diagram showing an embodiment of a system for controlling no load operation of an internal combustion engine according to the invention.

Referring to FIG. 1, a throttle valve 1 disposed in an intake air passage A of an internal combustion engine is operated by a control mechanism connected to an accelerator pedal 9. This control mechanism comprises a lever 2, a shaft of the throttle valve 1 is connected to a center position thereof, an accelerator link shaft 8 having a lever 18 connected to the lever 2 via a pin 14, and a lever 7 connected to the accelerator link shaft 8. The accelertor pedal 9 is connected at an end of the lever 7, and the lever 7 is swingably moved by the operation of the accelerator pedal 9. The oscillation of the lever 7 causes a rotational movement of the accelerator link shaft 8, and consequently, the shaft of the throttle valve 1 so that the throttle valve 1 opens when an operator of the engine steps on the accelerator pedal 9. The degree of rotation of the throttle valve 1 is controlled by the degree to which the accelerator pedal 9 is depressed.

A position of the lever 2 for defining the closed position of the throttle valve 1 is regulated by a cam 3 driven by a pulse motor 6 via a worm 5 and a worm wheel 4. The angular position of the throttle valve 1, when fully closed, is regulated by the forward or backward rotation of the pulse motor 6. Thus, the air supplied to the enginge increases or decreases as this throttle adjustment.

At the other end of the lever 7, a throttle position switch 10 is provided for detecting the release of the accelerator pedal 9, and it produces an output signal when the accelerator pedal 9 is released and the end of the lever 7 is pushed against the throttle position switch 10. The output signal of the throttle position switch 10 is fed to the control means C.

An electro-magnetic valve 11 is disposed in an auxiliary air bleed passage 15 of a carburetor B, communicating with a fuel passage of a slow speed circuit of the carburetor B. In response to a control signal from the control means C, the electro-magnetic valve 11 closes intermittently. The flow rate of the air through the auxiliary air bleed passage 15 is controlled in accordance with a ratio of the on/off rate of the electro-magnetic valve 11. The air/fuel ratio varies in accordance with the above operation since quantity of the fuel flowing through the fuel passage of the slow speed circuit varies with the increase and the decrease of the air flowing through the auxiliary air bleed passage 15.

In addition, an air fuel ratio sensor in the form of an oxygen sensor 12 of a small layered type is disposed in an exhaust gas passageway D. In the control means C, an output signal of the oxygen sensor 12 is used for controlling the electro-magnetic valve 11. The air/fuel ratio of actually supplied air-fuel mixture is thus indirectly estimated by means of the residual oxygen concentration within the exhaust gas.

Practically, the oxygen sensor 12 is a rich side oxygen sensor because an air-fuel mixture richer than a stoichiometric should be supplied during no load engine operation.

A manifold vacuum sensor in the form of a vacuum switch 13 is disposed within the intake air passage downstream of the throttle valve 1. The vacuum switch 13 is closed when the manifold vacuum within the intake passage exceeds a predetermined vacuum value to produce a signal indicative that the manifold vacuum is greater than the predetermined vacuum value. The signal from the vacuum switch 13 is fed to the control means C to cause same to produce a control signal to increase the air flow. This control signal is fed to the pulse motor 6 to cause same to slightly open the throttle valve 1, thus decreasing the manifold vacuum. An unstable combustion condition due to an undesirable enrichment of the air-fuel mixture caused by the vaporization of the fuel droplets on the throttle bore wall or the reduction of the suction efficiency, which otherwise may occur is avoided by this regulating operation.

In addition, an engine rotational speed sensor 16 and the coolant temperature sensor 17 of known type are also provided, and the output signals of these sensors are fed to the control means C.

The operation of the above control system is explained with reference to the flow diagram shown in FIG. 2A and FIG. 2B.

Referrence is first made to FIG. 2A. When the control system starts its operation, in step $P_1$ a determination is made by means of the throttle position switch 10 as to whether or not the accelerator pedal 9 is released. If the answer to this question is "no", the following operational sequence will not be effected since the engine is not running under no load condition.

If the answer to the question in step $P_1$ is "yes" when the engine is running under no load condtion, a determination is made in step $P_2$ as to whether the engine is idling or decelerating in other words if the vacuum switch 13 is open or closed. In case the engine is idling (vacuum switch open), the engine temperature is detected in step $P_3$ by the engine temperature sensor 17 and a target engine speed $N_R$ and target idle air/fuel ratio $(A/F)_R$ previously determined in accordance with the engine temperature, are established in a step $P_4$.

These target values $N_R$ and $(A/F)_R$ are preferably classified into two groups with respect to the engine warm-up condition or classified into plurality of groups in accordance with the specified engine temerature ranges.

In step $P_5$, an actual engine speed N is detected by the engine speed sensor 16 and compared with the target engine speed $N_R$. If the actual engine speed N exceeds the tatget engine speed by a predetermined value $\Delta N$, $[(N - N_R) \geq \Delta N]$, the control means C supplies, in step $P_6$, a forward driving signal to the pulse motor 6, and it causes the throttle valve 1 to slightly open. Then, in step $P_7$, a determination is made as to whether or not the vacuum switch 13 is closed If the vacuum switch 13 is closed, the control means C supplies a backward driving signal to the pulse motor 6 so as to slightly open the throttle valve 1 in step $P_8$. Then the vacuum is detected again in the step $P_9$, and the closing operation of the throttle valve is repeated in step $P_8$ if the vacuum switch 13 is closed in step $P_9$. Thus, the negative pressure value within the air intake passageway is regulated within a specified range, then a target deceleration air/fuel ratio $(A/F)_R$ is established in step $P_{10}$.

After the correction of the vacuum within the air intake passageway as described above, or if the vacuum switch 13 is not closed in step $P_7$, the following sequential air/fuel ratio closed loop control steps will be effected.

Referring to FIG. 2B, in step $P_{14}$, actual air/fuel ratio A/F detected by the oxygen sensor 12 in step $P_{13}$ is compared with the target air/fuel ratio $(A/F)_R$ established above.

If the actual air/fuel ratio A/F exceeds the target air/fuel ratio $(A/F)_R$ by a specified amount $\Delta(A/F)$, viz, $A/F - (A/F)_R \geq \Delta(A/F)$, each closing period of the electro-magnetic valve 11 is prolonged to decrease the amount of air in the air/fuel mixture which is supplied through the slow system of the carburetor so as to decrease the air/fuel ratio (the mixture is enriched) in step $P_{15}$. If the actual air/fuel ratio A/F does not exceed the target air/fuel ratio $(A/F)_R$ by the amount $\Delta(A/F)$, a determination is made in step $P_{16}$ as to whether or not actual air/fuel ratio A/F is within a tolerance range with respect to the target air/fuel ratio $(A/F)_R$. If the actual air/fuel ratio is in the tolerance range described by the equation $A/F - (A/F)_R > -\Delta(A/F)$, the air/fuel ratio control will not be carried out. Conversely, if the actual air/fuel ratio is smaller than the target air/fuel ratio $(A/F)_R$ by the amount $\Delta(A/F)$, the electronic control valve 11 is controlled to increase the air flowing therethrough in step $P_{17}$. Thus, the mixture is shifted to the lean side, in other words, the air/fuel ratio A/F is increased.

Turning again to step $P_5$, if the detected engine speed is in a tolerable range with respect to the target engine speed, in other words, if the detected engine speed is within a range described by the following equation $(N - N_R) > -\Delta N$, the air/fuel ratio control described above is immediately carried out. If the detected engine speed is below the target engine speed by the amount $\Delta N$, viz, $(N - N_R) < -\Delta N$, the pulse motor 6 is supplied with a backward drive signal from the control means C in step $P_{12}$, thus the throttle valve is slightly opened so as to raise the engine speed. Thus, the air/fuel ratio closed loop control will be effected after the engine speed has approached a value near the target engine speed.

In addition, if the vacuum switch 13 is closed in step $P_2$, that is, if the engine decelerates, the detection of the engine temperature is omitted, and the throttle valve 1 is gradually opened through steps $P_8$ and $P_9$, to a point where the vacuum falls below or becomes smaller than a specified level. Then the target air/fuel ratio is established in step $P_{10}$ and the closed loop control of air/fuel ratio as described above will be carried out.

The control of the engine speed and the air/fuel ratio under no load running conditions is thus accomplished by the repetition of the above closed-loop control of a specified cycle.

In the case of the above embodiment, the invention is explained by way of example of a control system for an engine equipped with a carburetor. However, the invention can be adapted also, without any difficulty, to an engine equipped with an electronically controlled fuel injection system. In the latter case, the air/fuel ratio can be controlled by varying the pulse width of the fuel injection control pulse signal. In addition, in the case of the engine equipped with a carburetor system, it is preferable to effect the air/fuel control by means of the electro-magnetic valve 11 during engine starting, along with an automatic choke mechanism in order to improve the cold engine start up. The function of adjusting the vacuum level during deceleration may be replaced with a throttle opener.

The temperature sensor or the establishment of the target value depending upon the engine temperature becomes unnecessary when an automatic choke mechanism is used. In addition, in case the oxygen sensor is not used, the rough adjustment of air fuel ratio can be effected by setting a fixed air/fuel ratio.

It will be appreciated from the foregoing, that according to the present invention, the engine speed and the air/fuel ratio during the no load engine running period are controlled by a closed loop control system which detects the no load engine running condition. Thus, the engine stability, fuel consumption characteristics, and the exhaust gas emission during such an engine operating condition are improved. In addition, after burning during deceleration is avioded since the air/fuel ratio is also optimally controlled during engine deceleration.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for controlling no load operation of an internal combustion engine, comprising:
   means for detecting the idling of the engine and producing an idle signal;
   an engine speed sensor for generating an actual engine speed signal indicative of the actual engine speed;
   an air fuel ratio sensor for generating an actual air fuel ratio signal indicative of the actual air fuel ratio;
   an engine temperature sensor for generating a temperature signal indicative of the actual engine temperature;
   target idle speed generating means for receiving said temperature signal and generating a target idle speed signal having a temperature dependent value indicative of idle speed required to sustain the operation of the engine at the sensed engine temperature;
   means for comparing said actual engine speed signal with said target idle speed signal and generating an idle air flow control signal indicative of the change in the air flow to the engine necessary to reduce the difference between the actual engine speed and the target idle speed to a predetermined engine speed differential value;
   a throttle valve for throttling said engine;
   means, operatively connected to said throttle valve, for varying the closure position thereof and for controlling the idle air flow to the engine in response to said idle air flow control signal to change the actual engine speed and reduce the difference between the actual engine speed and the target idle speed to said predetermined engine speed differential value;
   target idle air fuel ratio generating means, responsive to said idle signal, for receiving said temperature signal and generating a target idle air fuel ratio signal having a temperature dependent value;
   means for comparing said actual air fuel ratio signal with said target idle air fuel ratio signal and generating an idle air fuel ratio control signal indicative of the change in the air fuel ratio of the air fuel mixture to the engine necessary to reduce the difference between the actual air fuel ratio and the target idle air fuel ratio to a predetermined air fuel ratio differential value; and
   means for controlling the air fuel ratio of the air fuel mixture to the engine in response to said idle air fuel ratio control signal to change the air fuel ratio of the idle air fuel mixture to the engine and reduce the difference between the actual air fuel ratio and the target idle air fuel ratio to said predetermined air fuel ratio differential value.

2. A system for controlling no load operation of an internal combustion engine having a manifold and a throttle valve operatively disposed therein, comprising:
   means for detecting no load operation of the engine and for producing a no-load indicating signal;
   an engine speed sensor for generating an actual engine speed signal indicative of the actual engine speed;
   an air fuel ratio sensor for generating an actual air fuel ratio signal indicative of the actual air fuel ratio;
   an engine temperature sensor for generating a temperature signal indicative of the actual engine temperature;
   target idle speed generating means for receiving said temperature signal and generating a target idle speed signal having a temperature dependent value indicative of idle speed required to sustain the operation of the engine at the sensed engine temperature;
   means for comparing said actual engine speed signal with said target idle speed signal and generating an idle air flow control signal indicative of the change in the air flow to the engine necessary to reduce the difference between the actual engine speed and the target idle speed to a predetermined engine speed differential value;
   means for controlling the idle air flow to the engine in response to the presence of said no-load indicating signal and said idle air flow control signal to change the actual engine speed and reduce the difference between the actual engine speed and the target idle speed to said predetermined engine speed differential value, said idle air flow control means including drive means operatively connected to said throttle valve for varying the closure position of the throttle;

target idle air fuel ratio generating means, responsive to said no-load indicating signal, for receiving said temperature signal and generating a target idle air fuel ratio signal having a temperature dependent value;

means for comparing said actual air fuel ratio signal with said target idle air fuel ratio signal and generating an idle air fuel ratio control signal indicative of the change in the air fuel ratio of the air fuel mixture to the engine necessary to reduce the difference between the actual air fuel ratio and the target idle air fuel ratio to a predetermined air fuel ratio differential value;

means for controlling the air fuel ratio of the air fuel mixture to the engine in response to said idle air fuel ratio control signal to change the air fuel ratio of the idle air fuel mixture to the engine and reduce the difference between the actual air fuel ratio and the target idle air fuel ratio to said predetermined air fuel ratio differential value;

means responsive to the engine manifold vacuum for increasing the air flow to the engine when the engine is decelerating;

means for generating a target deceleration air fuel ratio signal when the engine is decelerating;

means for comparing said actual air fuel ratio signal with said target deceleration air fuel ratio signal and generating a deceleration air fuel ratio control signal to change the air fuel ratio of the air fuel mixture to the engine to reduce the difference between the actual air fuel ratio and the target deceleration air fuel ratio to said predetermined air fuel ratio differential value; and means for controlling the air fuel ratio of an air fuel mixture to the engine in response to said deceleration air fuel ratio control signal to change the air fuel ratio of the deceleration air fuel mixture to the engine and reduce the difference between said actual air fuel ratio and said target deceleration air fuel ratio to said predetermined air fuel ratio differential value.

3. A system as claimed in claim 2, wherein said air fuel ratio controlling means includes a valve arranged to control an air bleed which forms a part of said air fuel ratio control means.

4. A system as claimed in claim 2, wherein said no load operation detecting means includes means to sense the release position of an accelerator pedal.

5. A system for controlling no-load operation of an internal combustion engine having an induction manifold and a throttle valve operatively disposed in said manifold for controlling the flow of fluid therethrough;

means for detecting the position of an accelerator pedal associated with said engine and operable to produce a first signal indicative of a non-depressed position;

an engine speed sensor for sensing the engine speed and operable to produce a second signal indicative thereof;

an air-fuel ratio sensor for detecting the air-fuel ratio of the air-fuel mixture being combusted in said engine and operable to produce a third signal indicative thereof;

an engine temperature sensor for detecting the engine temperature and operable to produce a fourth signal indicative thereof;

means for detecting the induction manifold vacuum and operable to produce a fifth signal upon the vacuum exceeding a predetermined level indicative of engine deceleration;

computation means responsive to said first, second, third and fourth signals for:

(a) generating a target idle speed signal based on said fourth signal, said target idle speed signal having a temperature dependent value indicative of the idle speed required to sustain operation of the engine at the sensed engine temperature;

(b) comparing said second signal with said target idle speed signal and genrating an idle air flow control signal indicative of the change in the air flow to the engine necessary to reduce the difference between said second signal and the target idle speed signal to a predetermined engine speed differential value;

(c) generating a target idle air-fuel ratio signal based on said fourth signal;

(d) comparing the target idle air-fuel ratio with said third signal and producing a fuel supply control signal for varying the amount of fuel fed to said engine so as to reduce the difference between said target air-fuel ratio signal and said third signal to a predetermined air-fuel ratio differential value;

(e) in response to the presence of said fifth signal, generating a vacuum control signal for reducing the vacuum until it falls below said predetermined level and thereafter generating a target deceleration air-fuel ratio signal; and (f) comparing said target deceleration air-fuel ratio signal with said third signal and producing a deceleration air-fuel ratio control signal to reduce the difference between said target deceleration air-fuel ratio signal and said third signal to a predetermined air-fuel ratio differential value;

air-fuel mixture forming means associated with said induction manifold and responsive to said fuel supply control signal and said deceleration air-fuel ratio control signal for producing an air-fuel mixture in said manifold; and air-flow control means responsive to said idle air-flow control signal and said vacuum control signal, and air flow control means including drive and gear means operatively connected with said throttle valve for limiting the degree to which the throttle valve may close and thus control the amount of air fed to said engine in the presence of said first signal.

* * * * *